United States Patent
Blömer et al.

(10) Patent No.: US 12,157,264 B2
(45) Date of Patent: Dec. 3, 2024

(54) PLASTIC CONTAINER FOR FLUIDS AND METHOD FOR PRODUCING A PLASTIC CONTAINER

(71) Applicant: PROTECHNA S.A., Fribourg (CH)

(72) Inventors: Peter Blömer, Hennef (DE); Johannes Mosen, Dierdorf (DE); Carsten Erll, Helferskirchen (DE); Thomas Erll, Helferskirchen (DE)

(73) Assignee: PROTECHNA S.A., Fribourg (CH)

( * ) Notice: Subject to any disclaimer, the term of this patent is extended or adjusted under 35 U.S.C. 154(b) by 67 days.

(21) Appl. No.: 17/770,001

(22) PCT Filed: Sep. 25, 2020

(86) PCT No.: PCT/EP2020/076942
§ 371 (c)(1),
(2) Date: Apr. 18, 2022

(87) PCT Pub. No.: WO2021/083591
PCT Pub. Date: May 6, 2021

(65) Prior Publication Data
US 2023/0211541 A1    Jul. 6, 2023

(30) Foreign Application Priority Data
Oct. 31, 2019    (DE) .................. 10 2019 129 504.1

(51) Int. Cl.
*B29C 49/48* (2006.01)
*B29C 49/04* (2006.01)
(Continued)

(52) U.S. Cl.
CPC .............. *B29C 49/48* (2013.01); *B29C 49/04* (2013.01); *B29C 49/18* (2013.01); *B29C 49/22* (2013.01);
(Continued)

(58) Field of Classification Search
CPC ............ B65D 77/0466; B65D 77/0426; B65D 77/0446; B65D 77/065; B65D 77/0486; B65D 77/0493
See application file for complete search history.

(56) References Cited

U.S. PATENT DOCUMENTS

| | | | |
|---|---|---|---|
| 3,042,271 A | 7/1962 | Winstead | |
| 2003/0196923 A1* | 10/2003 | Decroix | B65D 77/0466 206/386 |

(Continued)

FOREIGN PATENT DOCUMENTS

| | | |
|---|---|---|
| CL | 201202987 | 4/2013 |
| CN | 1736691 A | 2/2006 |

(Continued)

OTHER PUBLICATIONS

Chilean Office Action for corresponding PCT/US2022/000862, mailed Jun. 23, 2023.

(Continued)

*Primary Examiner* — Jeffrey R Allen
(74) *Attorney, Agent, or Firm* — Quarles & Brady, LLP

(57) ABSTRACT

A plastic container and a method for producing a plastic container for liquids comprising an outer jacket made of latticework or of sheet metal material and a pallet-type understructure, the plastic container including a blow-molded body having a container socket in a container wall, the container socket provided with a container opening and connected to a flange of the container fitting via a welded joint, wherein the container wall has an inner layer made of a first plastic material and an outer layer made of a second plastic material, and the container socket has a longitudinal cross section widening toward the container opening such that an end face of the container socket is formed at least in part by an inner layer segment disposed opposite the outer (Continued)

layer, and a welding contact surface of the container socket is formed by the inner layer segment.

2 Claims, 4 Drawing Sheets

(51) Int. Cl.
   *B29C 49/18*   (2006.01)
   *B29C 49/22*   (2006.01)
   *B29C 49/42*   (2006.01)
   *B29L 31/00*   (2006.01)
   *B65D 77/04*   (2006.01)

(52) U.S. Cl.
   CPC ...... *B29C 49/4278* (2013.01); *B65D 77/0466* (2013.01); *B29C 2793/009* (2013.01); *B29L 2031/7126* (2013.01)

(56) References Cited

U.S. PATENT DOCUMENTS

| | | | |
|---|---|---|---|
| 2004/0089659 A1 | 5/2004 | Schutz | |
| 2006/0037695 A1* | 2/2006 | Schutz | B29C 66/53246 156/256 |
| 2008/0063822 A1 | 3/2008 | Iglesias Rodriguez | |
| 2008/0193582 A1 | 8/2008 | Langos | |
| 2012/0261063 A1 | 10/2012 | Schutz | |

FOREIGN PATENT DOCUMENTS

| | | |
|---|---|---|
| CN | 105102334 A | 11/2015 |
| CN | 107000882 A | 8/2017 |
| CN | 108778951 A | 11/2018 |
| DE | 2906974 A1 | 9/1980 |
| DE | 202006020793 U1 | 3/2010 |
| EP | 1630105 A1 | 10/2007 |
| EP | 2387492 B2 | 1/2016 |
| JP | 2006056604 A | 3/2006 |
| JP | 2012515098 B2 | 7/2012 |
| RU | 2286879 C1 | 11/2006 |
| WO | 1992001553 A1 | 2/1992 |
| WO | 2014016261 | 1/2014 |
| WO | 2017108288 A1 | 6/2017 |
| WO | 2019057265 | 3/2019 |
| WO | 2019057265 A1 | 3/2019 |

OTHER PUBLICATIONS

Japanese Office Action issued in corresponding U.S. Appl. No. 17/770,001, mailed on Mar. 6, 2023.
Colombian Office Action, dated Oct. 6, 2023, for corresponding application No. PCT/EP2020/076942.
International Search Report issued in corresponding PCT Application No. PCT/US2020/076942, mailed Jan. 12, 2021.
Indonesian Office Action for corresponding Indonesian Patent Application No. P00202205520, issued Aug. 7, 2024.
Korean Office Action for corresponding Korean Patent Application No. 10-2022-7014125, issued Jul. 29, 2024. (English Translation).
Chinese Office Action for corresponding application No. 202080075652.5, issued Jan. 18, 2024.(English translation not availble).

* cited by examiner

Fig. 2
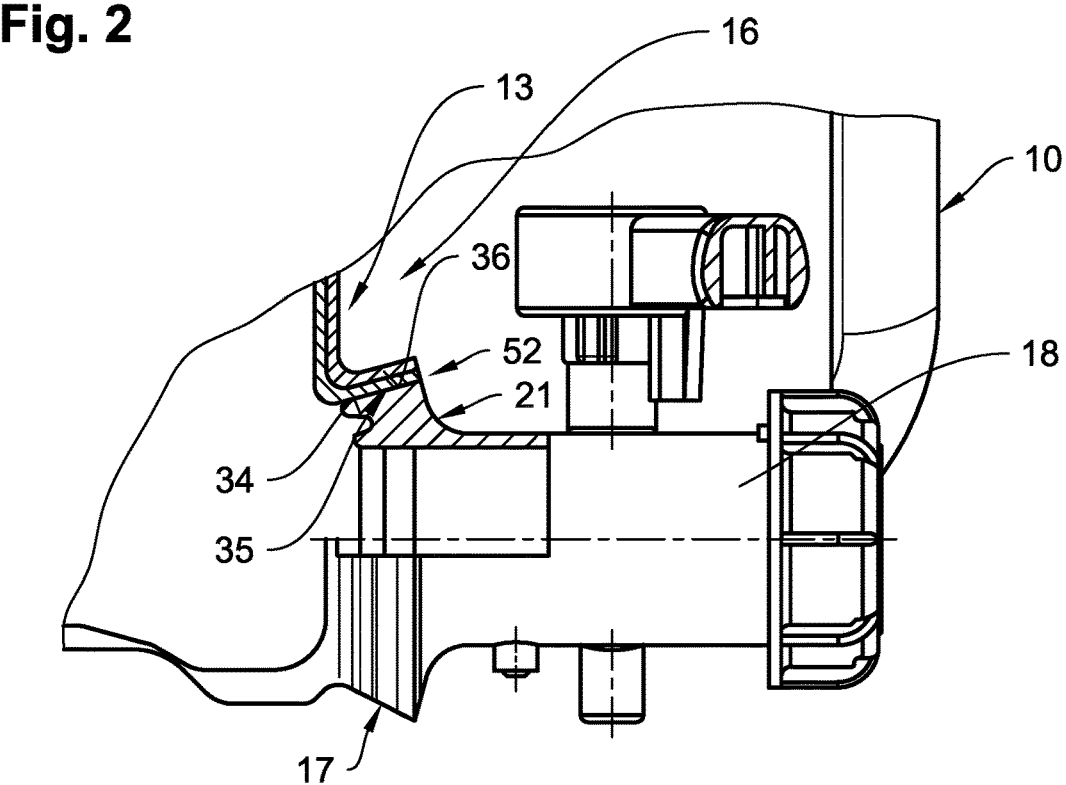
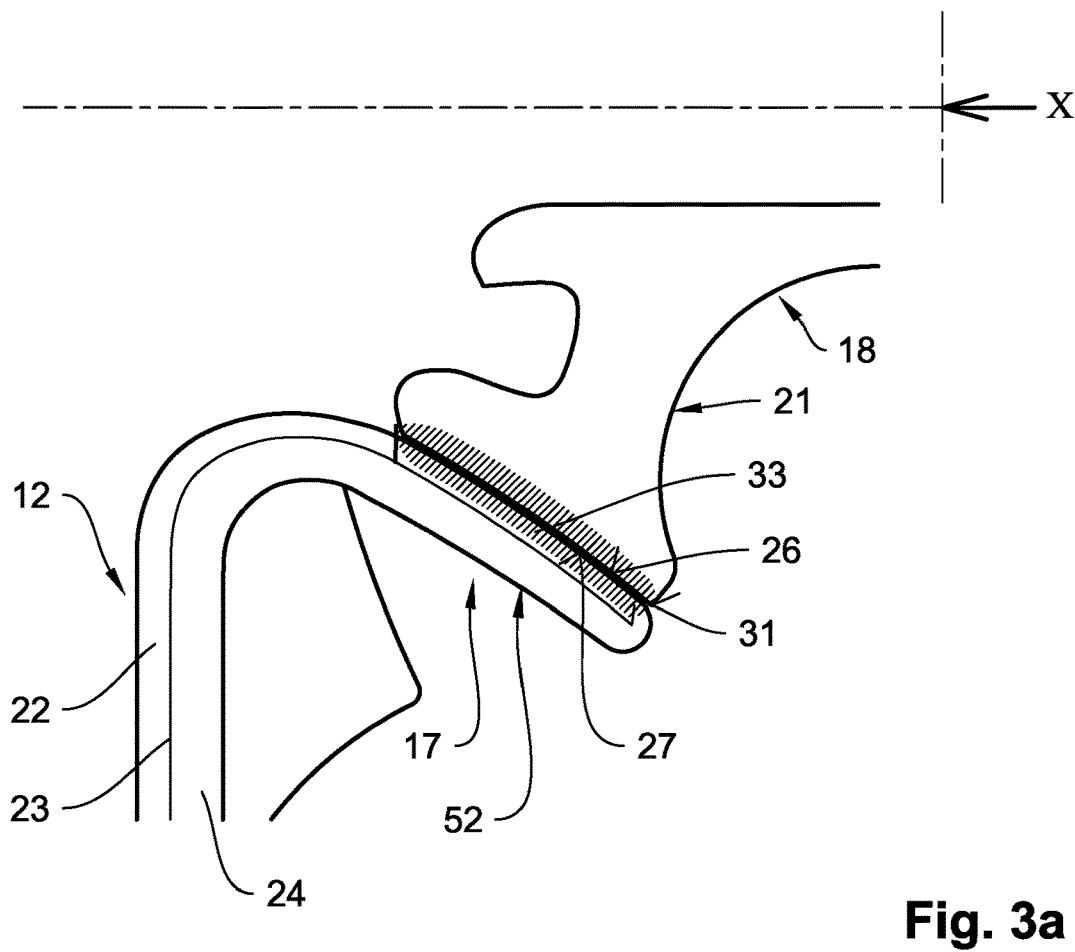
Fig. 3a

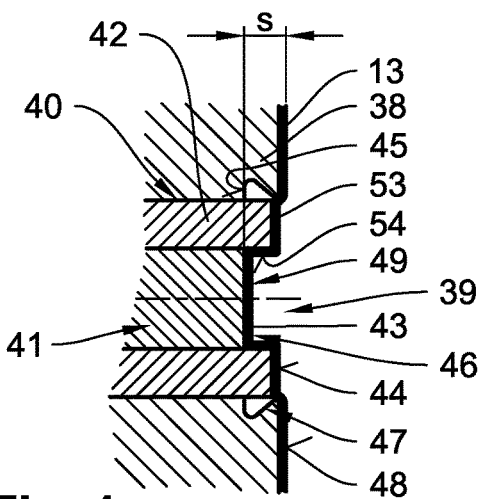
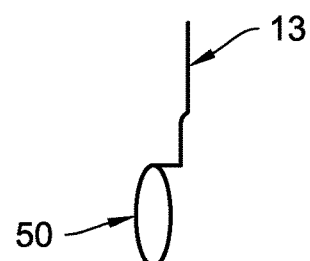
Fig. 4a  Fig. 4b
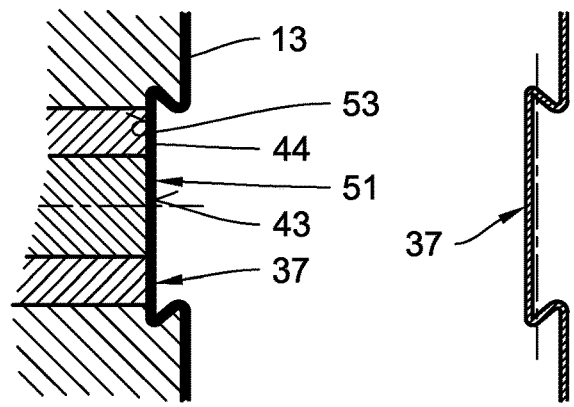
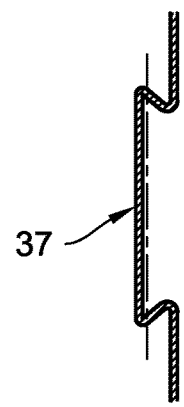
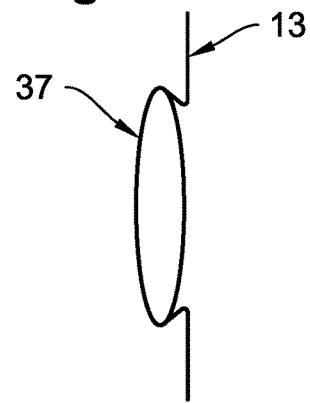
Fig. 5a  Fig. 5c  Fig. 5b
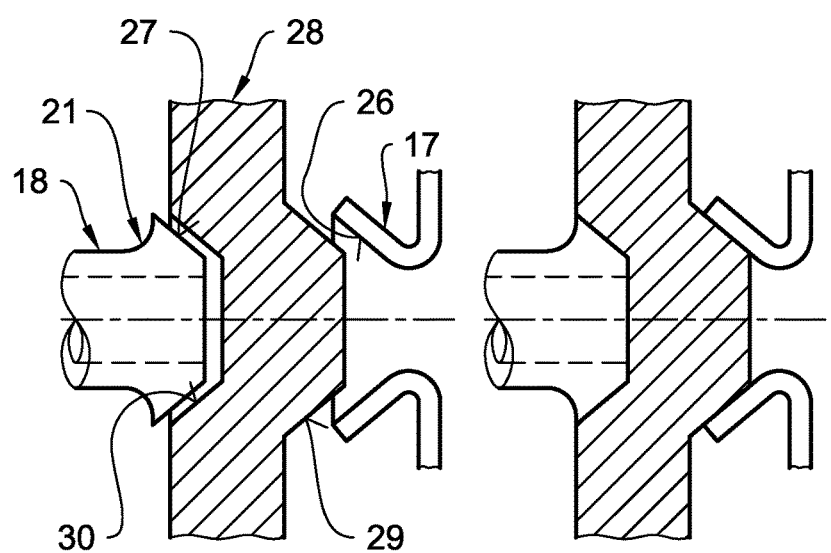
Fig. 6a  Fig. 6b  Fig. 6c

PLASTIC CONTAINER FOR FLUIDS AND METHOD FOR PRODUCING A PLASTIC CONTAINER

This application represents the national stage entry of PCT International Application No. PCT/EP2020/076942 filed on Sep. 25, 2020, which application claims priority to German Application No. DE 10 2019 129 504.1 filed Oct. 31, 2019, the entire contents of which are incorporated herein by reference for all purposes.

The present disclosure relates to a plastic container for liquids, in particular an inner container for transport and storage containers for liquids comprising an outer jacket made of latticework or of sheet metal material and a pallet-type understructure, the plastic container being realized as a blow-molded body by blow molding from a tubular preform in a blow mold and having a container socket for connecting a container fitting in a fitting connecting area of a container wall, the container socket being provided with a container opening and being connected to a connecting flange of the container fitting via a welded joint A plastic container of the kind mentioned above is known from EP 1 630 105 A1, said plastic container having a container fitting connected to a container socket via a hot-plate butt-welded joint. The known plastic container is produced by blow molding, wherein, in order to form a container socket serving to connect the container fitting, a bulge is formed in a fitting connecting area of the container wall simultaneously to production of the blow-molded body, a wall portion being removed from said bulge by means of a cutting tool so as to form a container opening in order to form the container socket. After use of the cutting tool, the container socket thus has a container opening having an outer edge which forms a welding contact surface in a plane parallel to the container wall.

During subsequent mirror welding or butt welding, a heating mirror is disposed as a hot plate between the container socket and a connecting piece of the container fitting disposed opposite in order to heat both a welding contact surface realized on the container socket and a welding contact surface realized on the connecting piece of the container fitting to their welding temperature, the welding contact surfaces being pressed against each other with pressure once the welding mirror has been removed and being allowed to cool in this position in order to form the welded joint.

The method described above for producing a welded joint between the container socket of the plastic container and the connecting piece of the container fitting is also used in particular in plastic containers whose container wall has a multi-layer structure in which an inner layer made of polyethylene is combined with an outer layer made of a reclaimed material, the two layers being separated by an EVOH barrier layer, for example. Neither the EVOH layer nor the reclaimed-material layer, which is made of a recycled material, is suitable for being welded in order to be connected to a container fitting, which is typically made of polyethylene, which means that the outer layer and the EVOH layer will have to be removed first in the area of the outer edge of the container socket in order to be able to produce a welded joint between the container socket and the container fitting.

Hence, the object of the present disclosure is to propose a plastic container and a method for producing a plastic container which has a multi-layer wall structure and which can be provided with a container fitting by means of a welded joint in a simple manner.

To attain said object, the plastic container according to the disclosure has the features of claim 1

According to the disclosure, the container wall has an inner layer made of a first plastic material and an outer layer made of a second plastic material, and the container socket has a longitudinal cross section widening toward the container opening in such a manner that an end face of the container socket is formed at least in part by an inner layer segment disposed opposite the outer layer, and a welding contact surface of the container socket is formed by the inner layer segment In this context, the term "end face" is to be interpreted as the surface projection of the container socket into a frontal plane of the plastic container, i.e., a plane parallel to the container wall having the container socket, such that the inner layer segment forms a surface projection into the end face, thus forming the welding contact surface of the container socket during when a welding contact is established between the connecting piece of the container fitting and the container socket. The fact that the position of the outer layer relative to the inner layer segment is defined such that the outer layer is disposed opposite the inner layer segment, i.e., facing away from the inner layer segment, prevents a welding contact from being established between the connecting piece of the container fitting and the outer layer of the container wall during welding. Instead, the design according to the disclosure limits the welding contact or the formation of a welding contact surface on the container socket to the inner layer segment. This ensures that no welding contact that adversely affects the quality of the welded joint can occur between materials that are incompatible in the context of a welded joint In a particularly preferred embodiment of the plastic container, the container socket is conical, the welding contact surface being formed by a wall surface of an inner cone which is provided with the inner layer and which is welded to an outer cone formed on the connecting piece of the container fitting In the method according to the disclosure, during blow molding of the plastic container having a container wall having an inner layer made of a first plastic material and an outer layer made of a second plastic material, the container wall is expanded into a widening wall recess of the blow mold in order to form the bulge in such a manner that the bulge formed in the container wall has a cross section increasing toward a covering wall and, once the covering wall has been cut off in order to form the container opening, a welding contact surface formed by an inner layer segment and extending toward the container opening is formed. The welding process described below can be implemented in particular as a hot-plate butt-welding process. The known friction welding techniques, such as, in particular, spin welding and vibration welding, are other possible welding techniques that are advantageously usable.

A production method of this kind ensures that the welding contact surface formed by the inner layer segment is disposed and exposed in an end face of the container socket and that a surface contact is thus formed between the inner layer segment and the connecting piece of the container fitting when a welding contact is established between the connecting piece of the container fitting and the container socket.

It is particularly preferred if the container wall is expanded into a conically widening wall recess so that the above-described conical welding contact surface with the resulting advantageous effects is obtained If the bulge is formed in at least two expansion steps, a central portion of the bulge being formed in a first expansion step and a conical wall portion of the bulge disposed concentrically with the central portion is subsequently formed in a second expansion step, the expansion occurring at maximum during formation of the bulge can be reduced as compared to when the bulge is formed in a single expansion step, the wall thickness reduction resulting from the expansion of the container wall being limited accordingly. Thus, it can be ensured in particular that the inner layer segment has the material thickness needed for forming a high-quality welded joint.

It is particularly advantageous if the central portion of the bulge is cylindrical, allowing an even wall thickness distribution to be obtained in the area of the cone.

Advantageously, the central portion of the bulge and the blow-molded body can be formed simultaneously, which means that the implementation of the two-stage expansion method is not accompanied by a significant increase in the duration of the blow molding process for producing the blow-molded body.

Hereinafter, a preferred embodiment of the disclosure will be explained in more detail with reference to the drawing.

FIG. 2 is an enlarged illustration of a fitting connecting area of the plastic container in a partly cut side view;

FIG. 3a is an enlarged detail view of a welded joint formed between a container socket and a connecting piece of the container fitting;

FIG. 3b is a front view of the container socket illustrated in FIG. 3a;

FIG. 4a shows a first production step for producing the container socket by blow molding;

FIG. 4b shows a central portion of a bulge for forming the container socket, said bulge having been produced on the plastic container in the first production step illustrated in FIG. 4a;

FIG. 5a shows a second production step for producing the container socket;

FIG. 5b shows the bulge for forming the container socket which has been produced on the plastic container in the second production step;

FIG. 5c is a section view of the bulge illustrated in FIG. 5b;

FIGS. 6a to 6c are schematic illustrations of how the container fitting is connected to the container socket by hot-plate butt welding.

Figure 1:
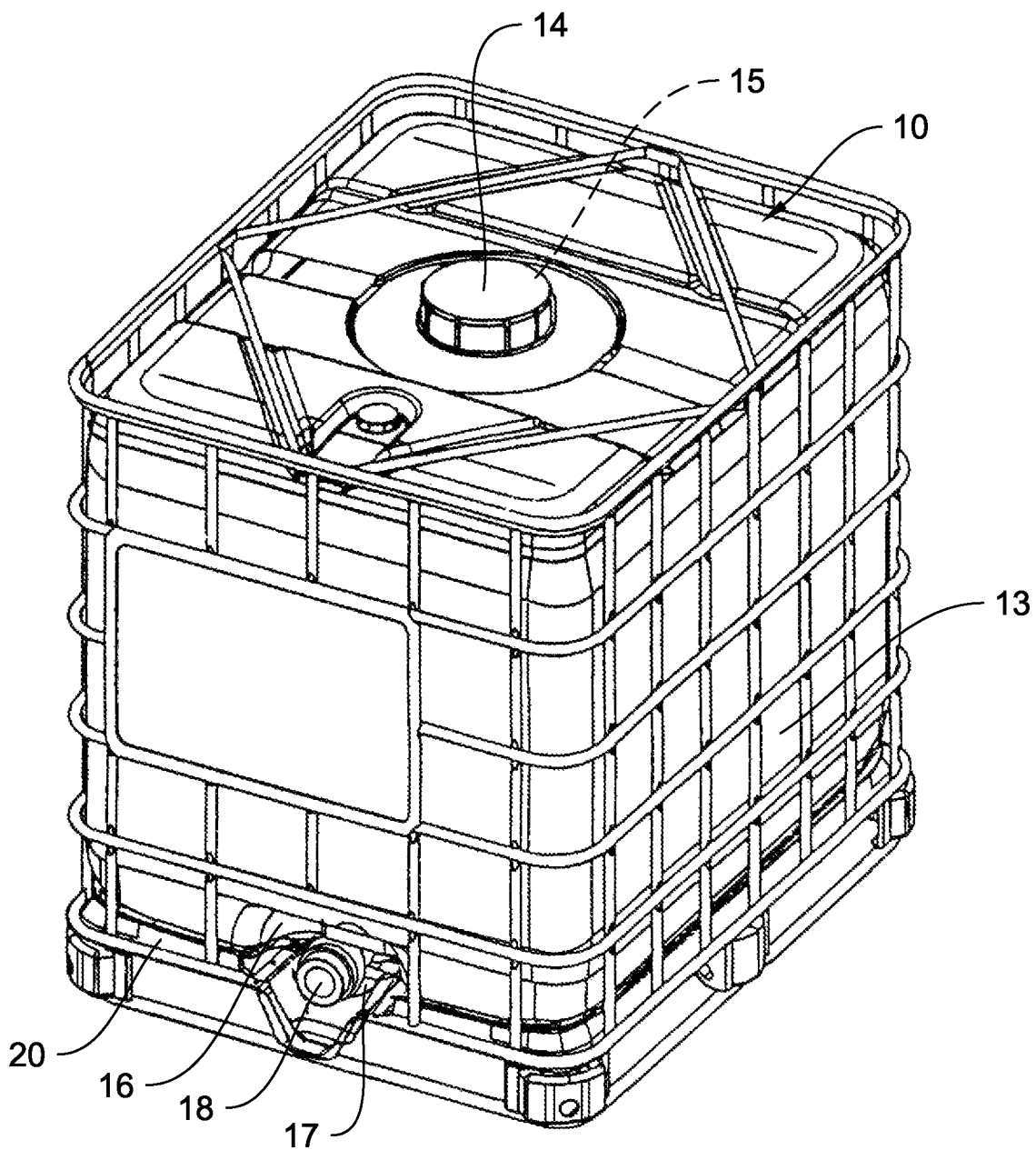
FIG. 1 is a perspective illustration of a liquid container realized as a pallet container and including an inner container realized as a plastic container

FIG. 1 shows a transport and storage container which can be used as a disposable container and as a reusable container and which has a plastic container 10 which has the shape of a cuboid in this case and which has, in the case at hand, a filling neck 15 formed in a container wall 13 at the top of plastic container 10 and provided with a cap 14, and a container socket 17 in a fitting connecting area 16 of container wall 13 at the front of plastic container 10, container socket 17 serving to connect a container fitting 18 which is realized as a tapping fitting in the case at hand.

In order to realize a transport and storage container, plastic container 10 is disposed on a pallet-type understructure 19 which has a supporting bottom 20 realized as a flat bottom vat in the case at hand for supporting plastic container 10.

Plastic container 10 is blow-molded from a tubular preform, container socket 17 being produced together with the cuboid body of plastic container 10 during the blow molding process.

FIG. 2 shows a welded joint 52 produced between container socket 17 and a connecting piece 21 of container fitting 18 after plastic container 10 has been produced by blow molding. As shown in FIG. 2 and in the enlarged illustration of FIG. 3, in particular, container wall 13 of plastic container 10 has a multi-layer wall structure, an inner layer 22 made of HDPE being separated from an outer layer 24 by a barrier layer 23 in the case at hand, barrier layer 23 being made of EVOH in the case at hand. Since inner layer 22 has to meet higher requirements regarding material quality because of the direct contact with the liquid contained in plastic container 10, in particular in the case of food contact, the inner layer is typically made of a homogenous material of defined composition, such as HDPE. Contrary thereto, recycled material, also referred to as reclaimed material, which is produced by shredding and grinding the plastic material of used plastic containers, is often used as a material for outer layer 24. Moreover, plastic container 10, which is realized as an explosion-proof container in the case at hand, has an ex-layer 25 made of an electrically conductive material as an outer surface.

The term outer layer as used herein refers to a layer which, contrary to the inner layer, is disposed toward the outside of the plastic container, although the outer layer does not necessarily have to form the outermost layer of the plastic container; instead, it can be provided with another layer disposed toward the outer side of the plastic container, such as the ex-layer mentioned as an example above or another functional layer or a decorative layer. Preferably, the inner layer consists of a material not used before and the outer layer consists of a material formed from grinded material, which can come from production waste produced during the production of blow-molded bodies or from recycled plastic containers.

Notwithstanding the exemplary embodiment described above, the inner layer and the outer layer can also be disposed one directly on top of the other. If a functional layer is interposed, such as the barrier layer mentioned as an example above, bonding agents can additionally be provided between the functional layer and the adjacent layers.

As illustrated in FIGS. 6a to 6c, a hot-plate butt-welded joint 52 as illustrated in FIGS. 2 and 3 between container socket 17 and connecting piece 21 of container fitting 18 is produced by first heating welding contact surfaces 26 and 27 to be welded together on container socket 17 and connecting piece 21 by means of a welding mirror 28 disposed between welding contact surfaces 26 and 27, which are disposed opposite each other, until a doughy texture is obtained. To this end, welding contact surfaces 26 and 27 are moved against heating surfaces 29 and 30 of welding mirror 28 and are heated by heat conduction, as illustrated in FIG. 6b. Once the required welding temperature has been reached in welding contact surfaces 26 and 27, i.e., once container socket 17 and connecting piece 21 have melted accordingly in the area of welding contact surfaces 26 and 27, welding mirror 28 is removed from its interposed position illustrated in FIG. 6b and welding contact surfaces 26 and 27 are moved against each other under pressure, as illustrated in FIG. 6c, so that welded joint 52 can form during subsequent cooling.

Since the production of a welded joint requires a corresponding material compatibility in the area of welding contact surfaces 26 and 27, a container fitting 18 made of a PE material cannot be welded to a barrier layer 23 made of an EVOH material or to an electrically conducting ex-layer 25 of container wall 13 whose material is not compatible.

Figure 3B:
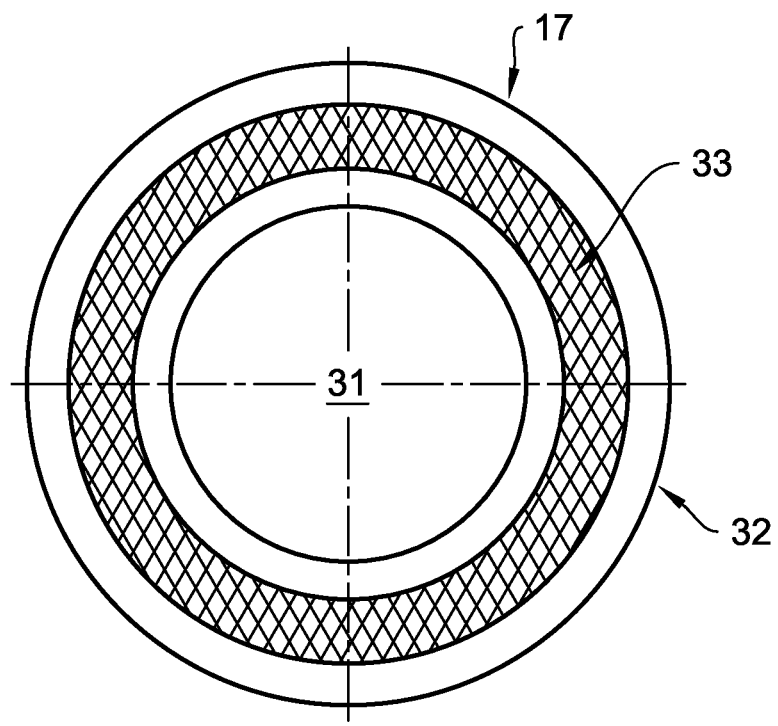

In order to ensure that the welded joint, which is illustrated as a hot-plate butt-welded joint in FIGS. 6a to 6c as an example, can be formed successfully between container wall 13, which contains barrier layer 23, outer layer 24 and ex-layer 25 in addition to inner layer 22, and connecting piece 21, container socket 17 has, as illustrated in FIGS. 2 and 3a in particular, a longitudinal cross section widening toward a container opening 31 formed on container socket 17, as illustrated in FIG. 3a, so that an end face 32 of container socket 17 illustrated in FIG. 3b, i.e., the surface of container socket 17 projected into the drawing plane in the front view X of container socket 17 illustrated in FIG. 3b, has an inner layer segment 33 which is exposed and thus available for direct contact with welding contact surface 27 of connecting piece 21 illustrated in FIG. 3a in order to form welding contact surface 26 when butt-welded joint 52 is produced. Neither barrier layer 23 nor ex-layer 25 can adversely affect the production of welded joint 52 when inner layer segment 33 forming contact surface 26 of container socket 17 is disposed in this way.

In the exemplary embodiment illustrated in FIGS. 2 and 3, container socket 17 is conical, welding contact surface 26 of container socket 17 being formed by a wall surface 34 of an inner cone 35 which is formed by container socket 17 and which is welded to an outer cone 36 formed on connecting piece 21 of container fitting 18.

The production of container socket 17 formed on container wall 13 by blow molding is to be explained hereinafter with reference to FIGS. 4a to 5c, container socket 17 being formed based on a bulge 37 initially formed in container wall 13. As shown by a comparison of FIGS. 4a and 5a, bulge 37 is produced in two expansion steps, a molding tool 40 disposed on a wall recess 39 in a mold wall 38 of a blow mold being used, as shown in FIG. 4a, molding tool 40 having, in the case at hand, a cylindrical inner slide 41 and an outer slide 42 disposed coaxially with cylindrical inner slide 41, slide bottoms 43 and 44 of inner slide 41 and outer slide 42 forming a mold bottom 46 of wall recess 39 except for a radial edge portion 45.

As shown in FIGS. 4a and 5a, wall recess 39 is realized in such a manner that it widens into mold wall 38 in the direction of mold bottom 46, thereby forming an annular undercut 47 in mold wall 38 in such a manner that wall recess 39 is conical on the whole.

As shown in FIG. 4a, during the first expansion step, inner slide 41 and outer slide 42 are in a relative position in which slide bottom 43 of inner slide 41 is located in the plane of mold bottom 46 and slide bottom 44 of outer slide 42 is essentially located in the plane of a mold wall surface 48 in such a manner that undercut 7 is covered by outer slide 42 and a cylindrical mold cavity 49 is formed within wall recess 39.

As shown by a combined view of FIGS. 4a and 4b, when container wall 13 is expanded into wall recess 39, a central portion 50 of bulge 37 is formed first, i.e., a preform of bulge 37, which is subsequently completed in the second expansion step illustrated in FIG. 5a, wherein, in order to execute the second expansion step, outer slide 42 is moved until its slide bottom 44 is flush with slide bottom 43 of inner slide 41, which means that both slide bottoms 43 and 44 are now disposed in the plane of mold bottom 46 and a mold cavity 51 which includes undercut 47 is formed.

In the second expansion step, a circular wall portion 53 of fitting connecting area 16 of container wall 13 which surrounds central portion 47 and which is still supported by outer slide 42 during the first expansion step is expanded, wall portion 53 having an area which is equal to the sum of the areas of slide bottom 44 of outer slide 42 and of a slide inner wall surface 54 formed by a slide projection s of outer slide 42 relative to inner slide 41. Since this area is only marginally smaller than the partial surface of wall recess 39 formed by the sum of slide bottom 44 of outer slide 42 and the surface of undercut 47, the expansion in the second expansion step illustrated in FIG. 5a essentially causes the edge portion 53 supported by outer slide 42 to be folded into radial edge portion 45 of mold bottom 46 and into adjacent undercut 47, wall portion 52 thus being expanded to a limited degree only and the portion of bulge 37 that is expanded the most being realized in the area of a covering wall 55 of bulge 37 which his in contact with mold bottom 46.

As indicated by the separating line in FIG. 5c, covering wall 55 forms the part of bulge 37 that is removed by a separating cut in order to form container opening 31 on container socket 17, which means that, finished container socket 17 has a wall thickness that is not reduced far enough compared to surrounding fitting connecting area 16 of container wall 13 to endanger the function of container socket 17.

The invention claimed is:

1. A plastic container for liquids, the plastic container being realized as a blow-molded body by blow molding from a tubular preform in a blow mold and having a container socket connected to a container fitting in a fitting connecting area of a container wall, the container socket being provided with a container opening and being connected to a connecting flange of the container fitting via a welded joint, wherein
the container wall has an inner layer made of a first plastic material and an outer layer made of a second plastic material, and the container socket has a longitudinal cross section widening toward the container opening in such a manner that an end face of the container socket is formed at least in part by an inner layer segment disposed opposite the outer layer, and a welding contact surface of the container socket is formed by the inner layer segment wherein
the container socket is cone-shaped in such a manner that the welding contact surface is formed by a wall surface of an inner cone, the inner cone being provided with the inner layer and being welded to an outer cone formed on a connecting piece of the container fitting.

2. The plastic container for liquids of claim 1, wherein the plastic container forms an inner container of a transport and storage container for liquids comprising an outer jacket made of latticework or of sheet metal material and a pallet-type understructure.

\* \* \* \* \*